United States Patent
Takahara et al.

Patent Number: 6,078,583
Date of Patent: Jun. 20, 2000

[54] COMMUNICATION METHOD AND COMMUNICATION SYSTEM

[75] Inventors: Keiko Takahara, Kawasaki; Tohru Hoshi, Yokohama; Toshiaki Koyama, Zama, all of Japan

[73] Assignee: Hitachi, Ltd., Tokyo, Japan

[21] Appl. No.: 08/961,154

[22] Filed: Oct. 30, 1997

[30] Foreign Application Priority Data

Oct. 31, 1996 [JP] Japan .................................. 8-290037

[51] Int. Cl.[7] ........................... H04L 12/46; H04L 12/56
[52] U.S. Cl. ........................ 370/356; 370/401; 370/410; 370/466
[58] Field of Search .................................. 370/352, 353, 370/354, 355, 356, 389, 392, 401, 409, 410, 465, 466, 467; 379/219, 220, 221; 709/245, 249, 250

[56] References Cited

U.S. PATENT DOCUMENTS

| | | | |
|---|---|---|---|
| 5,351,237 | 9/1994 | Shinohara et al. | 370/392 |
| 5,724,412 | 3/1998 | Srinivasan | 379/93.23 |
| 5,828,844 | 10/1998 | Civanlar et al. | 709/228 |
| 5,835,725 | 11/1998 | Chiang et al. | 709/228 |
| 5,956,391 | 9/1999 | Melen et al. | 379/114 |

FOREIGN PATENT DOCUMENTS 9-168065  6/1997  Japan .

OTHER PUBLICATIONS

Network Working Group Request for Comments: 1459, J. Oikarinen, et al., May 1993, "Internet Relay Chat Protocol".

*Primary Examiner*—Chi H. Pham
*Assistant Examiner*—Kwang B. Yao
*Attorney, Agent, or Firm*—Antonelli, Terry, Stout & Kraus, LLP

[57] ABSTRACT

A communication system and communication method adapted so that the user of one of the communication terminals can more easily communicate with another one connected to the internet through the public network. Connection management servers for relay and manage the communication are provided at nodes between the internet and the public network. Each of the connection management servers assigns an IP address to the communication terminal connected to the internet through the public network, and registers the IP address and the telephone number. When receiving a communication request, the connection management server specifies a communication route to the communication terminal on the basis of the telephone number of the called-side communication terminal set in the communication request. The server checks if the called-side communication terminal is connected to the internet on the basis of the above registration. If it is connected to the internet, the server relays the communication request. If it is not connected thereto, the notice that it is not connected is transmitted to the calling-side communication terminal. If it is not connected yet, the server regards the called-side terminal as having its telephone connected to the telephone channel, and causes speech transmission between that telephone and the calling-side communication terminal.

14 Claims, 13 Drawing Sheets

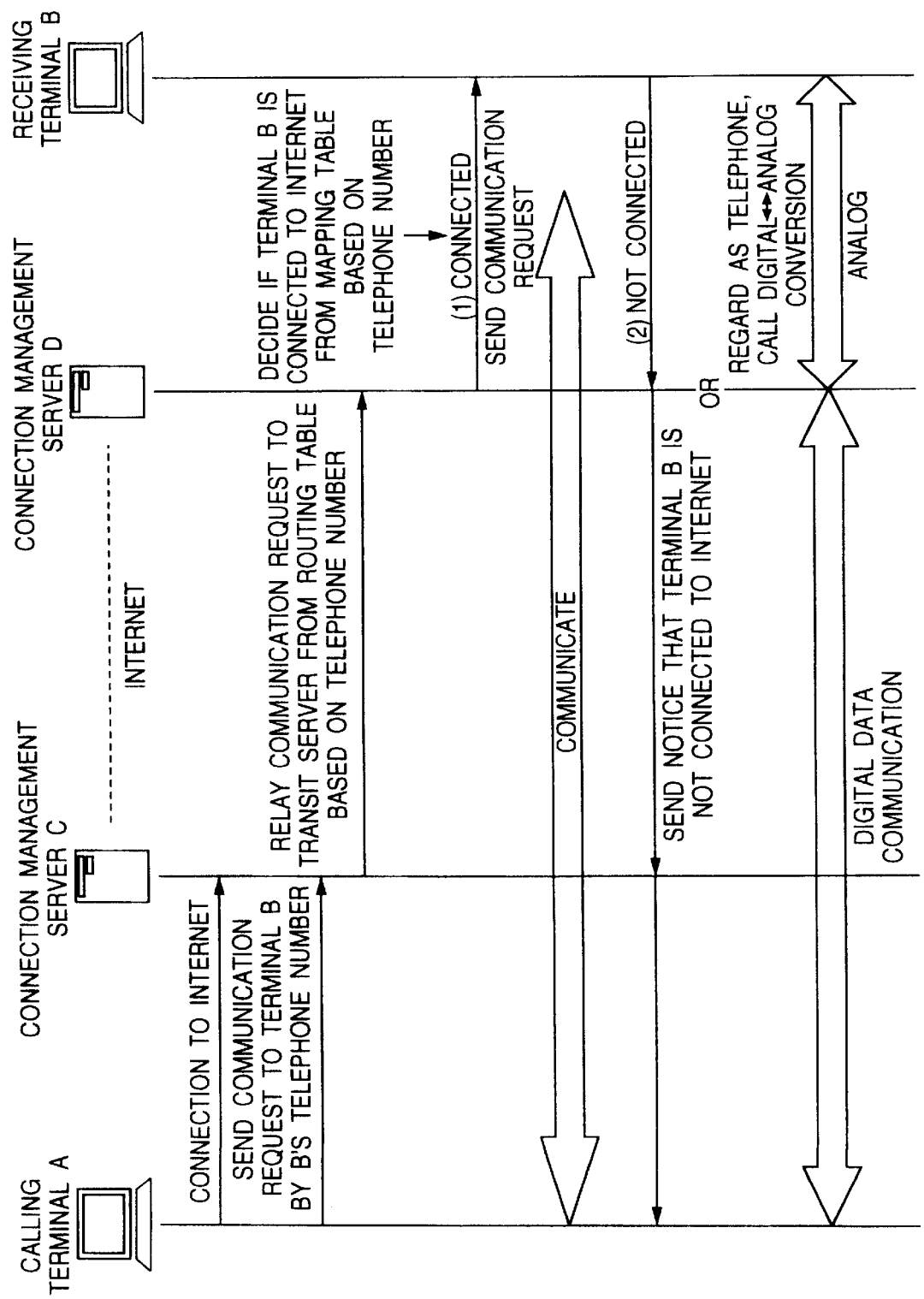

COMMUNICATION METHOD AND COMMUNICATION SYSTEM

BACKGROUND OF THE INVENTION

The present invention generally relates to communication systems, and particularly to a communication method and communication system for the internet connected to communication terminals through the public network.

The internet based on TCP/IP (Transmission Control Protocol/Internet Protocol) has come into world use rapidly. In the internet, the connected communication terminals are discriminated and controlled by means of IP address. One of the methods of specifying the communication terminal as a called party is to directly designate the called party by use of IP address. Another method is to once make access to a rendezvous server such as IRC (Internet Relay Chat) server, and select the called party. For example, see a document entitled "Internet Relay Chat Protocol", Network Working Group, Request for Comments: 1459, J. Oikarinen, D. Reed, May 1993.

When a communication terminal is selected as a called party to which an IP address is fixedly assigned as in the communication terminals of an intra-company network, communication can be started with ease by specifying the IP address of that terminal.

However, a dial-up type communication terminal is not connected to the internet through the public network until an IP address is assigned to that terminal by making access to the internet, and hence the IP address to be assigned is changed at each access. Therefore, when real time communication is performed relative to the terminal to be connected to the internet through the public network, it is necessary that the calling party makes access to the rendezvous server to which that terminal is connected, select the called party from the currently accessed list of communication terminals which is provided by the rendezvous server, and request the communication with the called party.

SUMMARY OF THE INVENTION

In the conventional communication system, when real-time communication is started between the communication terminals connected to the internet through the public network, the user of the calling-side terminal is required to make such troublesome operations as to once access the rendezvous server, and select the called party. In addition, if the called-side terminal has not made access to the rendezvous server, the communication cannot be started.

Accordingly, it is an object of the invention to make it easier to start communications between terminals connected to the internet through the public network. Moreover, it is another object of the invention to make it possible to start communications and speech even if the called-side terminal is not connected to the internet.

According to one aspect of the invention, there is provided a communication system including the internet, a plurality of communication terminals which connect with the internet through a public network, and a plurality of connection management servers provided at nodes between the public network and the internet and at the transit points within the internet in order to relay and manage the communication between the communication terminals, each of the connection management servers having means for receiving from a communication terminal a connection request for the internet and the telephone number of the terminal, and assigning an IP address to the communication terminal, a mapping table in which the IP address assigned to the communication terminal and the telephone number of the communication terminal are registered in pair, a routing table having routing information registered in association with each of the telephone numbers within an area which the connection management server manages, means for receiving a communication request from a communication terminal to another one (the called-side communication terminal), and the telephone number of the called-side communication terminal, and means for determining a communication route to the called-side communication terminal on the basis of the routing information registered in the routing table in association with the telephone number which is received together with the communication request, and transferring the communication request and the telephone number through the communication route, and the connection management server, when connected to the called-side communication terminal through the public network, further including means for deciding if the called-side communication terminal is connected to the internet by examining whether the telephone number of the called-side communication terminal received together with the communication request from the calling-side communication terminal is registered in the mapping table, means for transferring the communication request to the called-side communication terminal when the called-side communication terminal is connected to the internet, and means for receiving from the calling-side communication terminal the connection termination (or end) notice that the connection to the internet has become unnecessary because of the end of the communication, and deleting the IP address assigned to the calling-side communication terminal and registered in the mapping table.

In addition, each of the connection management servers preferably further has means for sending the notice to the calling-side communication terminal that the called-side communication terminal is not connected to the internet when the called-side communication terminal is not connected to the internet.

Moreover, each connection management server preferably further has means for calling the communication terminal through the telephone channel of the telephone number when the called-side communication terminal is not connected to the internet, means for sending the IP address of the connection management server to the calling-side communication terminal, means for converting an analog speech signal into speech data, and converting speech data into an analog speech signal, and means for transmitting/receiving the analog signal through the calling telephone channel, and transmitting/receiving the speech data to/from the calling-side communication terminal.

Also, the calling-side communication terminal preferably has means for converting the input analog signal into speech data, and reproducing speech from speech data, and means for transmitting/receiving the speech data to/from the connection management server connected to the called-side terminal through the public network in accordance with the communication request.

In addition, the connection management server preferably has means for calling the communication terminal through the telephone channel of the telephone number when the called-side communication terminal is not connected to the internet, and transferring the communication request, and means for receiving a permission notice relative to the communication request from the called-side communication terminal, and assigning an IP address to the called-side communication terminal. The communication terminal has means for automatically receiving the call from the connection management server by a receiving portion, means for generating the permission notice by a command generator portion in accordance with the communication request, and sending back the permission notice by the transmitting portion, and means (communication-enabling process control portion) for making the communication with the calling-side communication terminal effective when the permission notice is returned, thereby causing the communication to be performed.

In this communication system, since the connection management server determines the communication route by specifying the telephone number of the called-side communication terminal, and executes the relay, the user can easily start the communication without managing the connection management server connected to the called-side communication terminal.

According to another aspect of the invention, connection management servers for relaying and managing communications are installed at the modes between the internet and the public network. The connection management server assigns an IP address to the communication terminal connected to the internet through the public network, and registers the IP address and telephone number. When receiving a communication request, the server identifies a communication route to the communication terminal on the basis of the telephone number of the called-side communication terminal set in the communication request. The server checks if the called-side communication terminal is connected to the internet according to the registration. If it is connected to the internet, the communication request is relayed. If it is not connected to the internet, the notice that it is not connected to the internet is sent to the calling-side communication terminal. When it is not connected yet, a telephone is regarded as being connected to the telephone channel of the called-side communication terminal, communication or speech can be executed between the telephone and the calling-side communication terminal.

BRIEF DESCRIPTION OF THE DRAWINGS

FIG. 13B is a sequence diagram useful for explaining the communication sequence in the communication system shown in FIG. 13A.

DESCRIPTION OF THE PREFERRED EMBODIMENTS

Figure 1:
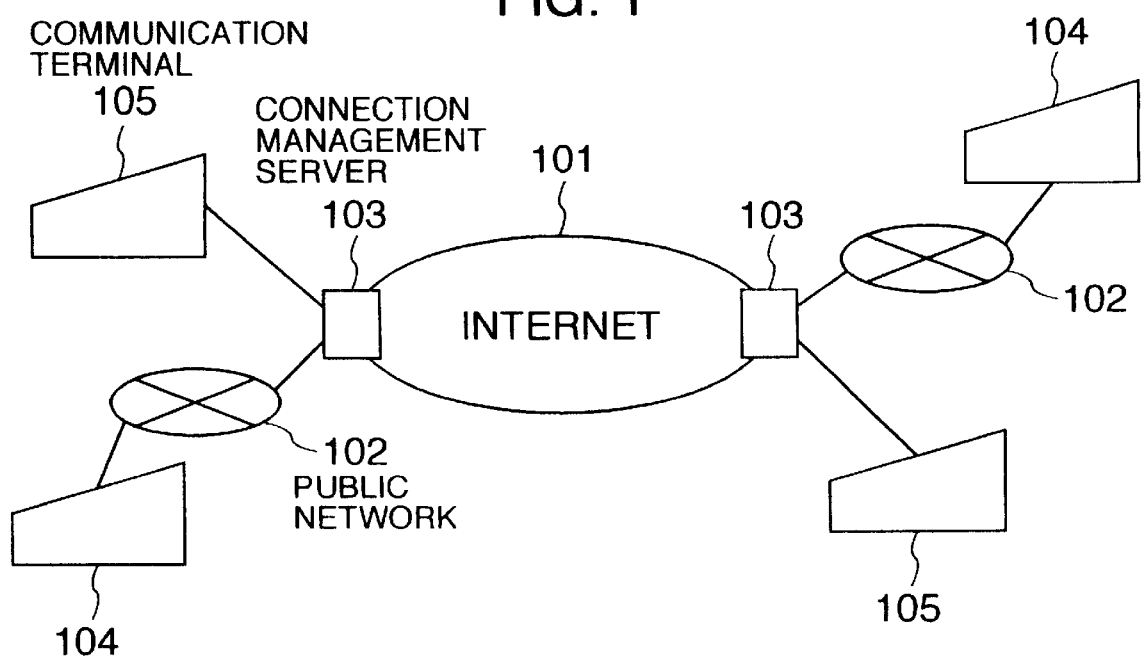
FIG. 1 is a block diagram of the whole construction of a communication system according to a first embodiment of the invention.

The communication system of the first embodiment of the invention will be first described with reference to FIGS. 1 to 4. Like parts in all the drawings are identified by like reference numerals, and will not be described repeatedly.

FIG. 1 shows an example of the communication system according to the first embodiment of the invention. Referring to FIG. 1, the communication system includes an internet 101, public networks 102, connection management servers 103 which are provided at a node between the internet 101 and one of the public networks 102 and at the transit points in the internet, respectively, and communication terminals 104, 105 which are connected to the networks 102 and to the internet 101, respectively.

Figure 2:
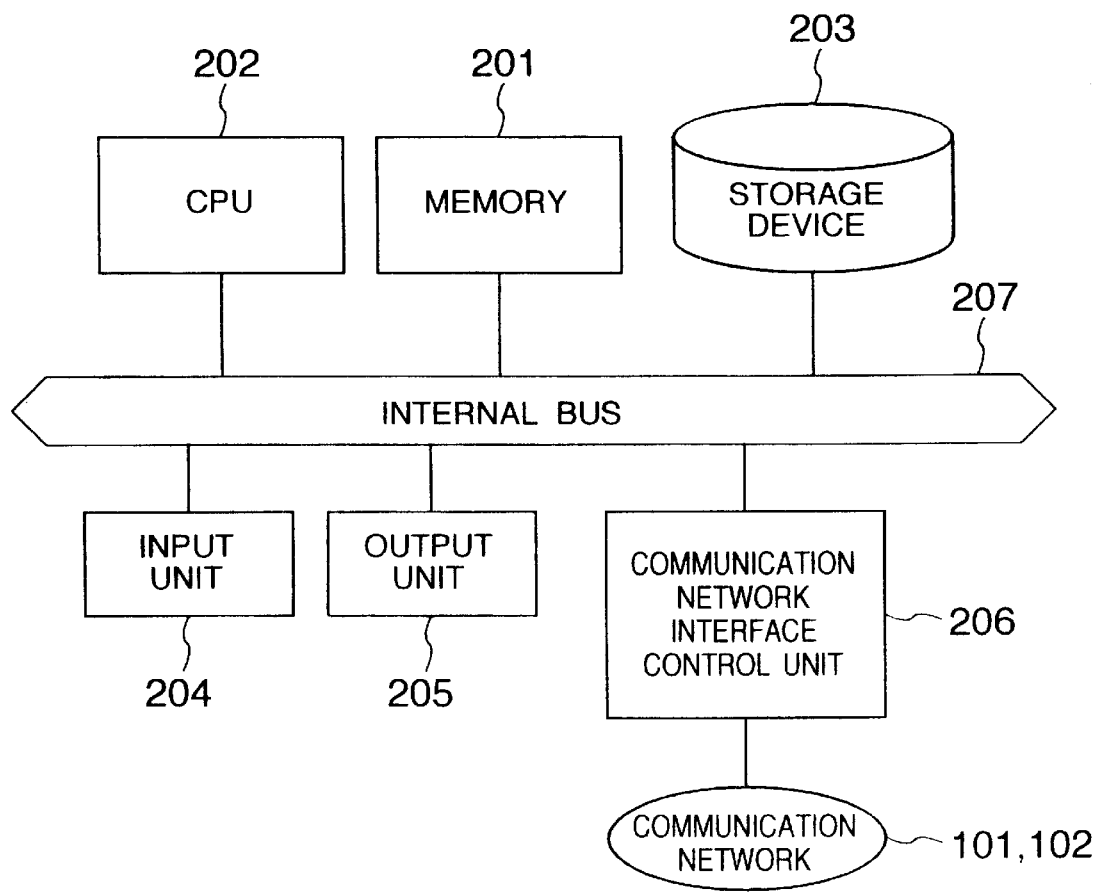
FIG. 2 is a block diagram of the construction of the communication terminal shown in FIG. 1.

FIG. 2 shows the internal construction of the communication terminal 104, 105.

Referring to FIG. 2, the communication terminal 104, 105 includes a memory 201 for storing a communication program and so on, a CPU 202 for executing the process based on the program from the memory 201, a storage device 203, an input unit 204 formed of a keyboard and so on, an output unit 205 formed of a display and so on, a communication interface control unit 206 which controls communication to be performed through the internet and public networks, and an internal bus 207 which connects the above elements. The storage device 203 has previously stored telephone numbers of other terminals 104 with which communications are to be made and the user names of the terminals 104 in pair, and the telephone number of the nearest connection management server 103 as well.

The communication terminal 104 is connected by dial-up connection to the internet 104 through the public network 102. In that case, the communication terminal 104 sends a connection request to the connection management server 103 in which connection request the telephone number of the terminal 104 has previously been registered. In addition, the terminal 104, 105, when starting to communicate with another terminal 104, transmits a communication request to the connection management server 103 in which communication request the telephone number of the called terminal has previously been set.

Figure 3:
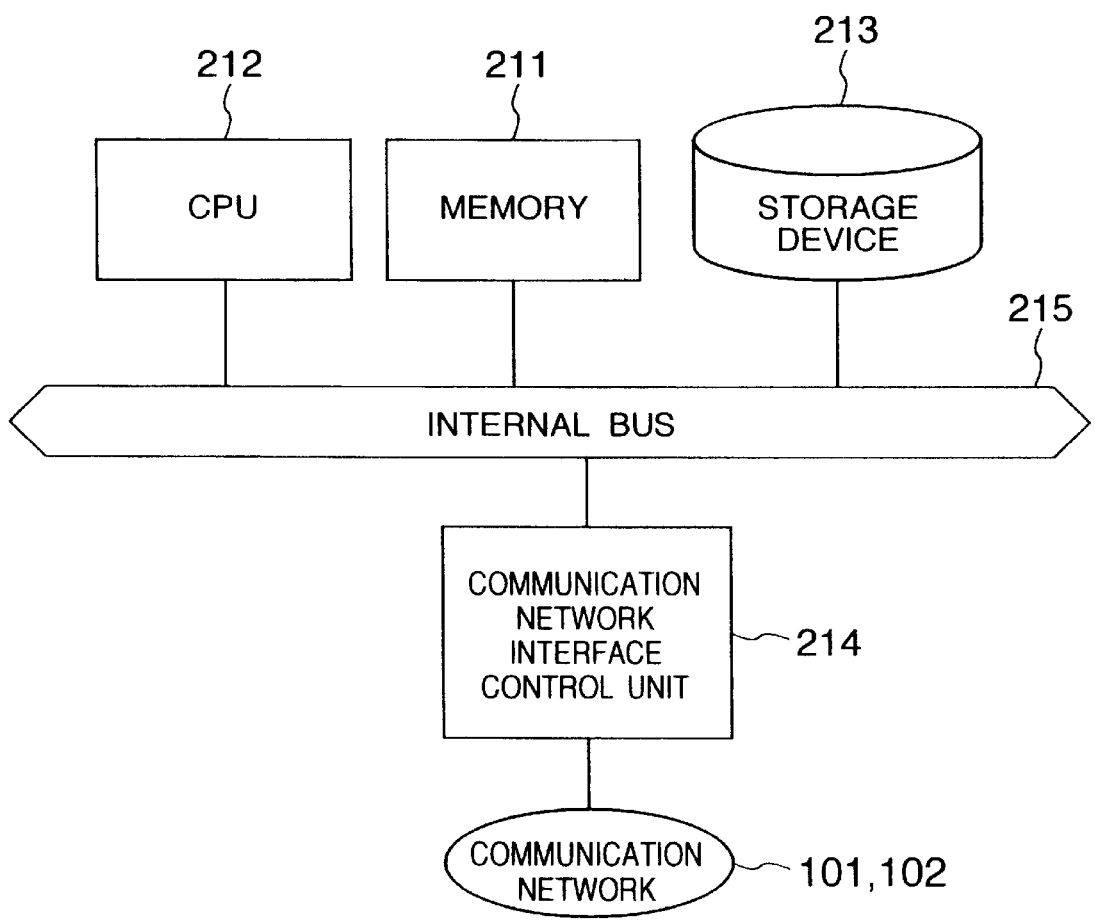
FIG. 3 is a block diagram of a connection management server shown in FIG. 1.

FIG. 3 shows a construction of the connection management server 103.

Referring to FIG. 3, the connection management server 103 is made up of a memory 211 for storing a communication program or the like, a CPU (Central Processing Unit) 212 for executing the process for communication control, a storage device 213 for storing mapping information and routing information, a communication network interface control unit 214 which controls communications to be performed through the internet and public network, and an internal bus 215 which connects the above elements. The routing information in the storage device 213 is registered in association with the area codes of the telephone numbers, and includes the information on the connection management server 103 which covers the areas of the area codes and the information on communication routes to the connection management server 103.

Figure 4:
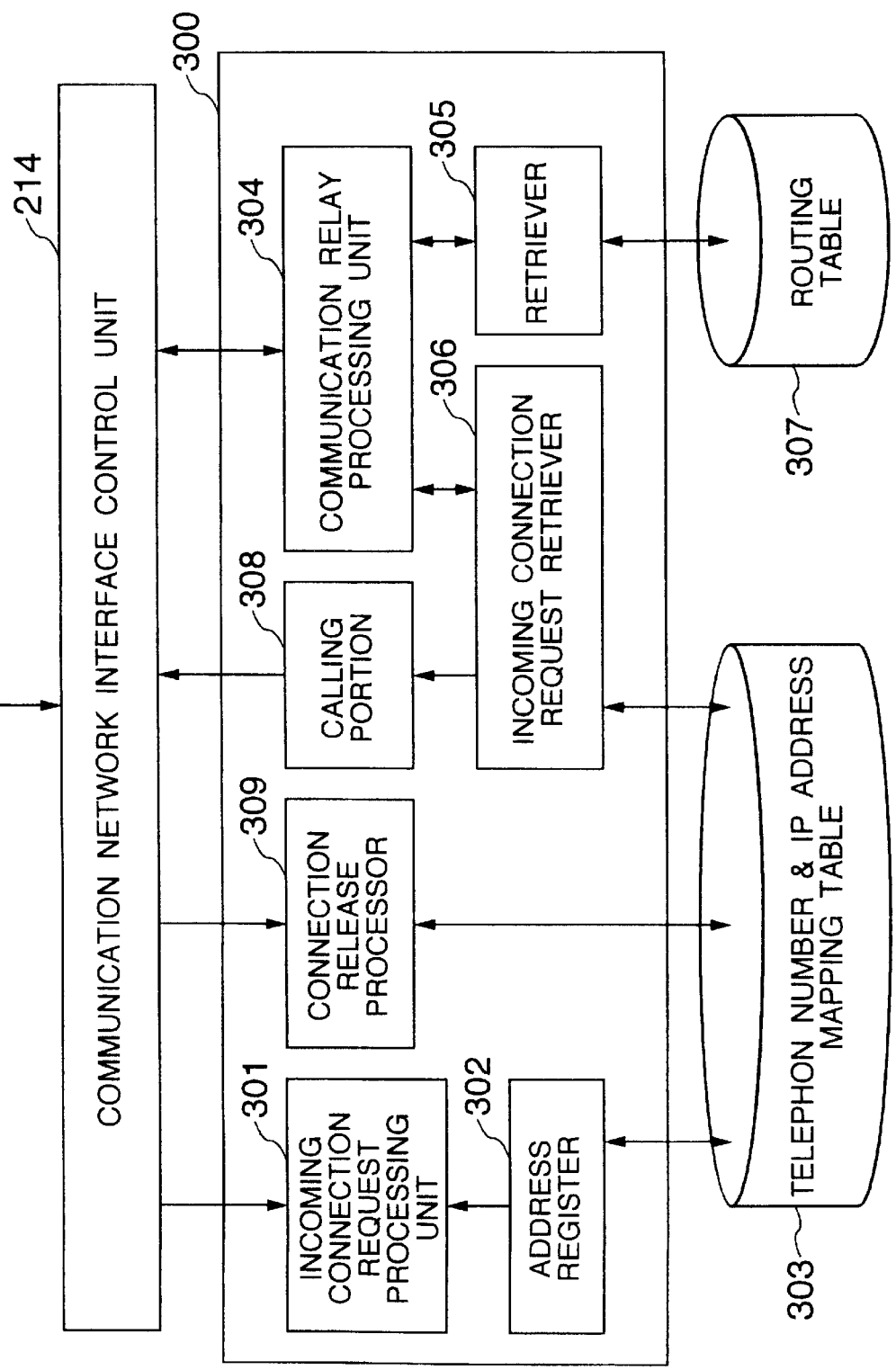
FIG. 4 is a block diagram of the communication control unit of the connection management server shown in FIG. 3.

The CPU 212 executes the communication program from the memory 211, thereby realizing the functions of a communication control unit 300 shown in FIG. 4. The communication control unit 300 illustrated in FIG. 4 includes a connection request terminating processing unit 301, an address registering portion 302, a communication relaying processing unit 304, a retriever 305, an connection request termination or reception retriever 306 and a calling portion 308. The communication control unit 300 makes access to the recording regions of a mapping table 303 and routing table 307 which are provided in the storage device 203.

In the communication control unit 300, when a connection request to connect the terminal to the internet 101 is sent to the server from the communication terminal 104 through the public network 102, the connection request terminating processing unit (IP address assigning means) 301 gives the terminal 104 notice that it has assigned one of the currently unused IP ones of the IP addresses pooled within the server itself. The address registering portion 302 registers in pair in the mapping table 303 the telephone number of the terminal 104 which has been set in the above connection request and the IP address assigned to that terminal. The communication relaying processing unit (communication request accepting or receiving means) 304 executes relaying operations on the communication request which the terminal 104 already connected to the internet 101 has sent to another communication terminal 104, and on the data which is transmitted or received between the terminals through the internet 101 and public network 102. The retriever (communication route setting means) 305, when the communication request to the other terminal 104 is received, acquires the telephone number of the called-side terminal 104 set in that communication request, retrieving the routing information which has been registered in the routing table 307 in association with that telephone number, and determining the next connection management server as the next destination, or transit node to which the communication request is to be sent, and the route to that server. The connection request termination retriever (means for deciding if the connection to the internet is made) 306 checks to see if the telephone number of the called-side terminal is already registered in the mapping table 303, and deciding whether that terminal is already connected to the internet or not. When the telephone number of the called terminal 104 is registered in the mapping table 303, the calling portion (communication request transfer means) 308 acquires the IP address which was in pair with the associated telephone number, and transfer the communication request to the called-side terminal 104 by using the IP address.

The connection releasing (end) processing unit (means for assigning IP address and registering/deleting it in the mapping table) 309, when receiving the notice of an end (releasing) of connection from the terminal 104, transfers the end notice to the other server i.e., called server and cuts off the call.

Figure 5:
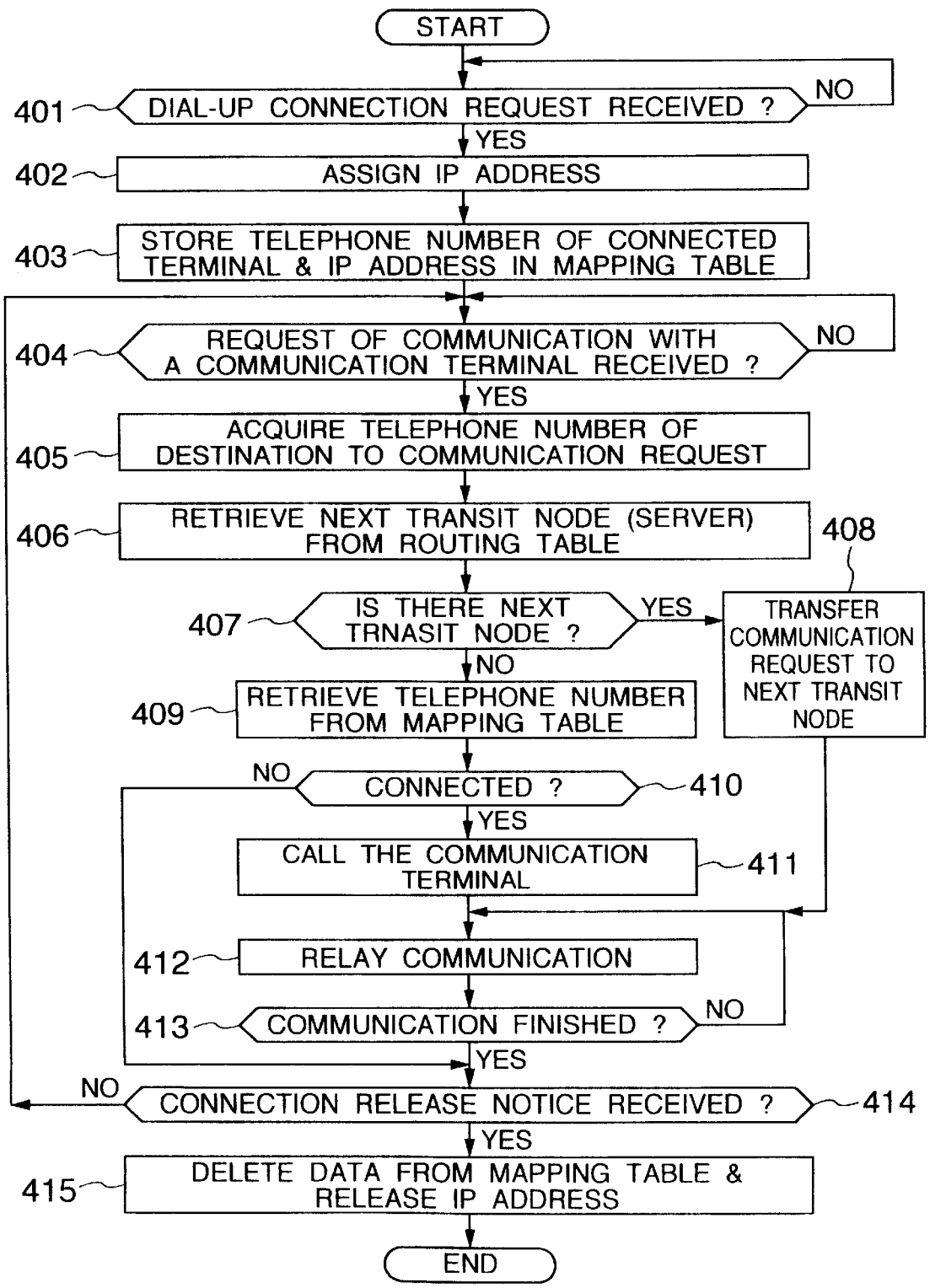
FIG. 5 is a flowchart of the process in the connection management server shown in FIG. 3.

FIG. 5 shows one example of the whole flow of processing in the connection management server 103.

Referring to FIG. 5, when the connection management server 103 receives a dial-up connection request from a certain communication terminal 104 (step 401), an IP address is assigned to that terminal 104 (step 402), and the telephone number of that terminal 104 is acquired and the IP address and the telephone number are registered in pair in the mapping table 303 (step 403). When a communication request is received for another communication terminal 104 from the terminal 104, 105 that is already connected to the internet 101 (step 404, Yes), the telephone number of the called-side terminal set in the communication request is obtained (step 405), and used to search for the connection management server 103 as the next transit node in the routing table 307 on the basis of the acquired telephone number (step 406). As a result of this retrieval, when there is no connection management server 103 as the next transit node (step 407, No), the own server on the calling side is regarded as the connection management server 103 nearest to the called terminal 104, and searching is made of whether or not the telephone number of the called terminal 104 has already been registered in the mapping table 303 of the own server (step 409). When this telephone number is found after the retrieval (step 410, Yes), the IP address which is in pair with that telephone number is taken out of the mapping table 303, and used to execute the calling process on the basis of this IP address (step 411), and the communication request is transferred to the called-side terminal 104 according to this IP address. Then, the communication between the terminals 104 is relayed (step 412). When the communication end notice is received (step 413, Yes), the communication relay is terminated. When the dial-up calling terminal 104 sends the notice of the end of connection (step 414, Yes), the mapping information for the associated terminal 104 is deleted from the mapping table 303, and the assigned IP address is released from the assignment (step 415).

The communication terminal 104, when instructed to connect and communicate by its user, automatically generates and sends a connection request and communication request on the basis of the registered contents of the storage device of the own terminal. Even when the communication terminal instructs a communication request, it suffices that the user may give the terminal only the name of the user of the called party. In addition, even when the information of the called party has not been registered within the own terminal, it suffices that the user may directly designate the telephone number.

According to the communication system of this embodiment, the communication route between the communication terminals can be determined on the basis of the telephone number of the called-side terminal, and hence it is possible to decrease the operations required for the user of the calling-side terminal to start communication as compared with the conventional system.

Another communication system as a second embodiment of the invention will be described with reference to FIG. 6.

In the communication system of this embodiment, the process for giving the calling-side terminal the notice that the called-side terminal is not connected to the internet is added to the process of the connection management server 103 of the first embodiment (as shown in FIG. 4). The whole construction of the system and the calling and terminating processings are the same as those in the first embodiment (FIGS. 1 through 5).

Figure 6:
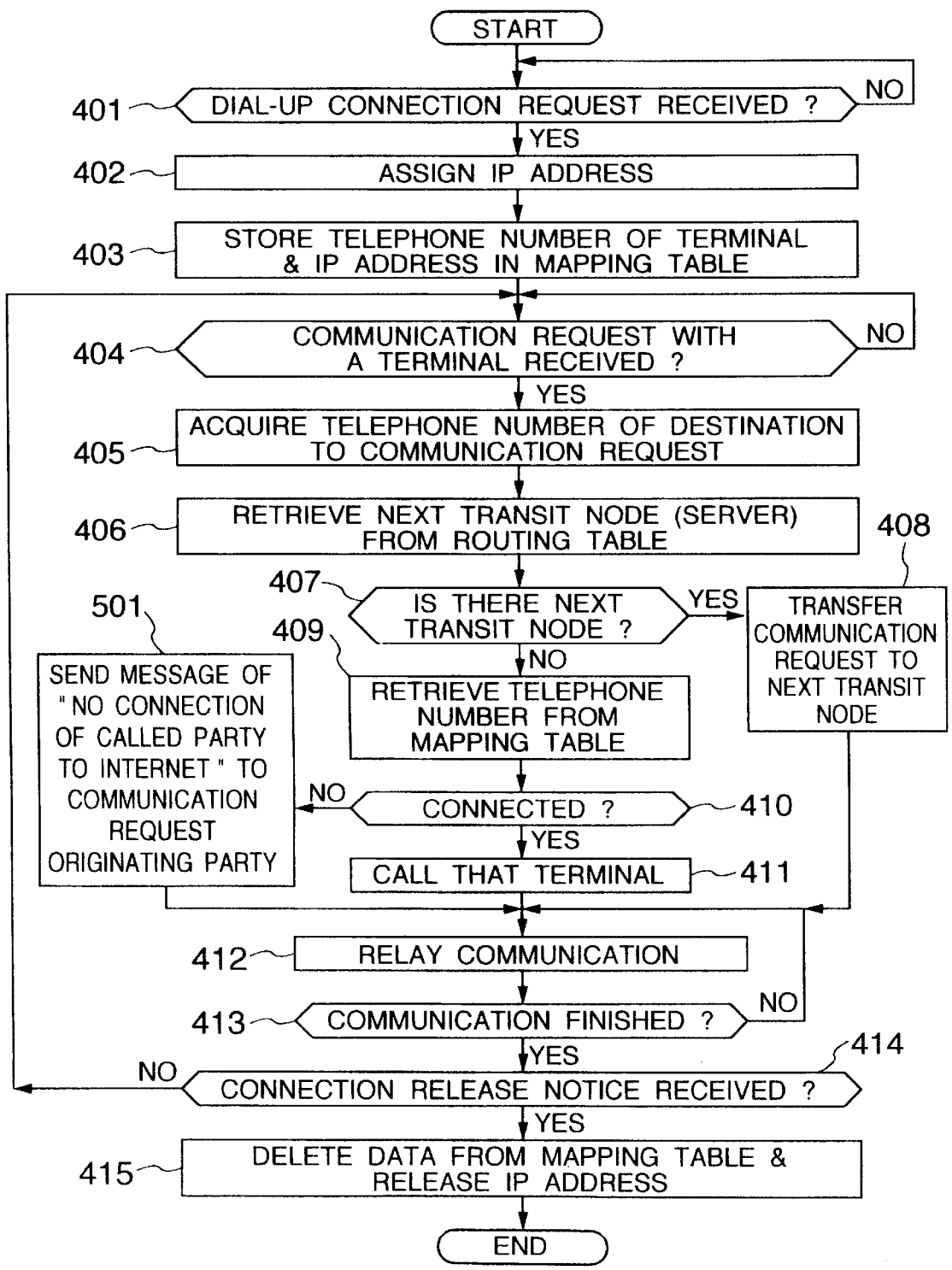
FIG. 6 is a flowchart of the process in the connection management server of a communication system according to a second embodiment of the invention.

FIG. 6 is a flowchart for executing the process in the connection management server 103 of this embodiment.

Referring to FIG. 6, if the connection management server 103 of this embodiment confirms that the called-side terminal 104 is not connected to the internet at the above-mentioned step 410, it issues the message that the communication request cannot be accepted since the called-side terminal is not connected to the internet (step 501). This message is relayed or transferred to the connection management server 103 as the transit node provided immediately before the own server by the relay process at the above-given step 412. The step 501 constitutes means for sending the notice that the called-side terminal is not connected to the internet. If the own server corresponds to the connection management server nearest to the calling-side terminal, that message is transmitted to the calling-side terminal.

The conventional system has the problem that when the communication request is not allowed, the calling-side user often cannot understand the cause thereof and thus cannot properly deal with the situation. The communication system of this embodiment is able to inform the calling-side user of the fact that the communication request is not accepted because the called-side terminal is not connected to the internet, and to urge the user to take an appropriate treatment.

A third embodiment of the invention will be described with reference to FIGS. 7 through 9.

The communication system of this embodiment, when the called-side terminal is not connected to the internet, regards this terminal as having a telephone connected to the telephone circuits, to thereby allow speech transmission.

The whole construction of this system and the calling/terminating processes in this system are the same as those in the first embodiment. However, the input unit 204 of the communication terminal 104, 105 of this embodiment has a keyboard, mouse, electronic pen, electronic camera, microphone and so on, and the output unit 205 thereof has a display, loudspeaker and so on. The terminal also has a digital-analog/analog-digital converter for the communication by speech data. In addition, the connection management server 103 of this embodiment also has a digital-analog/analog-digital converter for the execution of calls using speech data.

The digital-analog/analog-digital converter of the communication terminal also compresses/expands speech data and video data for use in communication, thereby increasing the communication efficiency.

Figure 7:
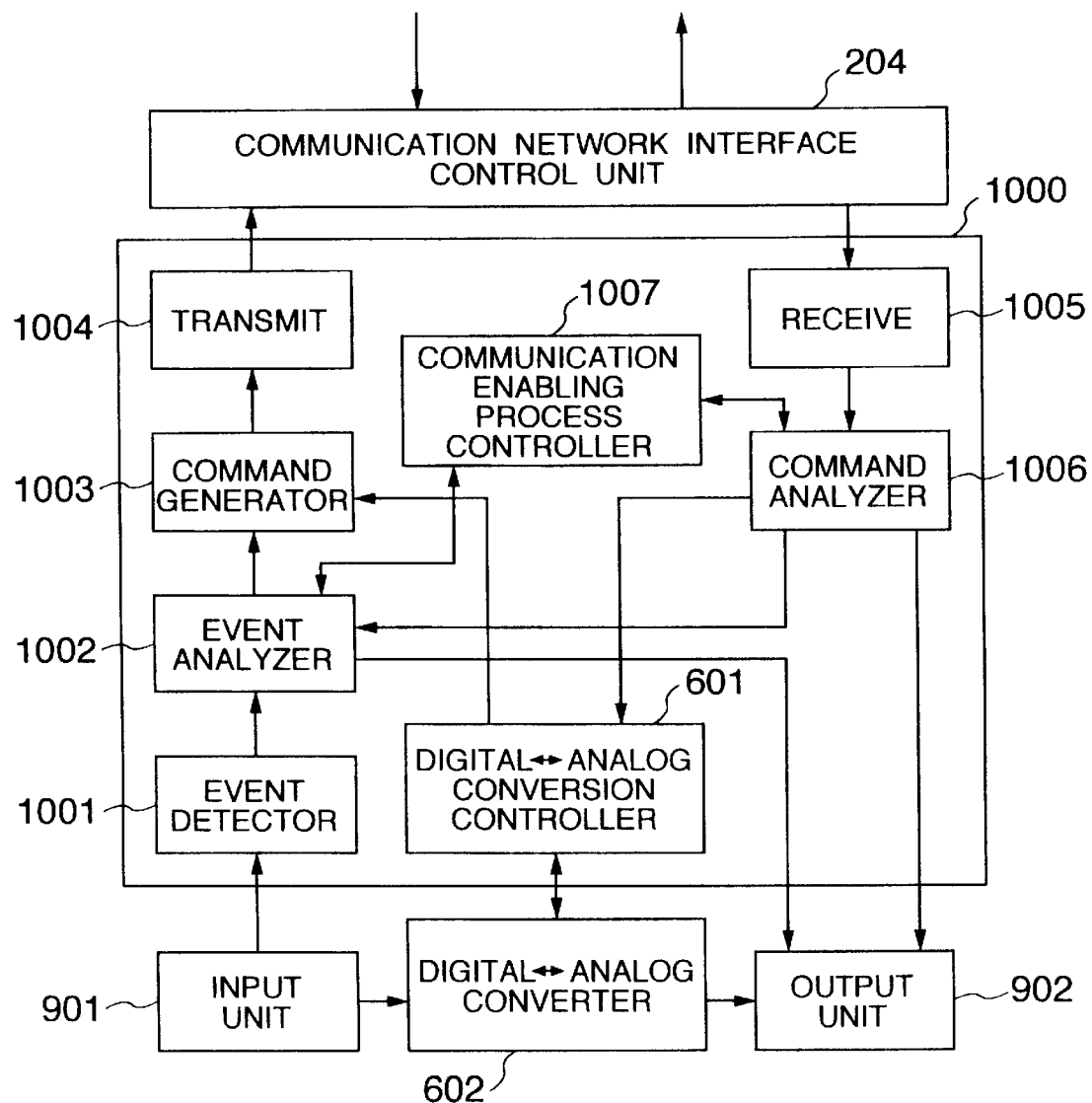
FIG. 7 is a block diagram of a client communication control unit of the communication terminal in a communication system according to a third embodiment of the invention.

FIG. 7 shows the construction of a client communication control unit 1000 of the terminal 104.

The client communication control 1000 can be materialized when the CPU 202 executes a communication program stored in the memory 201. Referring to FIG. 7, the client communication control unit 1000 is made up of an event detector 1001 for detecting an event fed to the input unit 204, an event analyzer 1002 for analyzing the detected event, a command generator 1003 for generating a command which is to be sent to the called party in accordance with the analyzed results, a transmitting portion 1004 for transmitting the generated command, a receiving portion 1005 which executes the process for terminating the incoming control command and data from other communication terminals through the communication interface control unit 206 and which also automatically terminates the communication request relayed through the connection management server or the calls from the connection management server, a analyzer 1006 for analyzing the control command terminated by the incoming portion 1005 and transferring the command to the corresponding processing unit, and a digital-to-analog/analog-to-digital conversion controller 601 which controls the digital-to-analog/analog-to-digital converter to allow speech transmission. The transmitting portion 1004 and the receiving portion 105 constitute means for transmitting and receiving speech data. The client communication control unit 1000 with the above functions, in addition to transmit and receive text data, is able to convert the input speech and images into speech data and video data, transmit those data, and reproduce the received speech data and video data. In addition, when the communication terminal 104 is a called-side terminal, the elements 1001 through 1004 constitute permission notice sending-back means for transmitting the permission notice back in accordance with the communication request. The communication control unit 1000 also includes a communication enabling processing controller 1007 for making the communication effective for the calling-side terminal in response to the sending-back of the permission notice.

Figure 8:
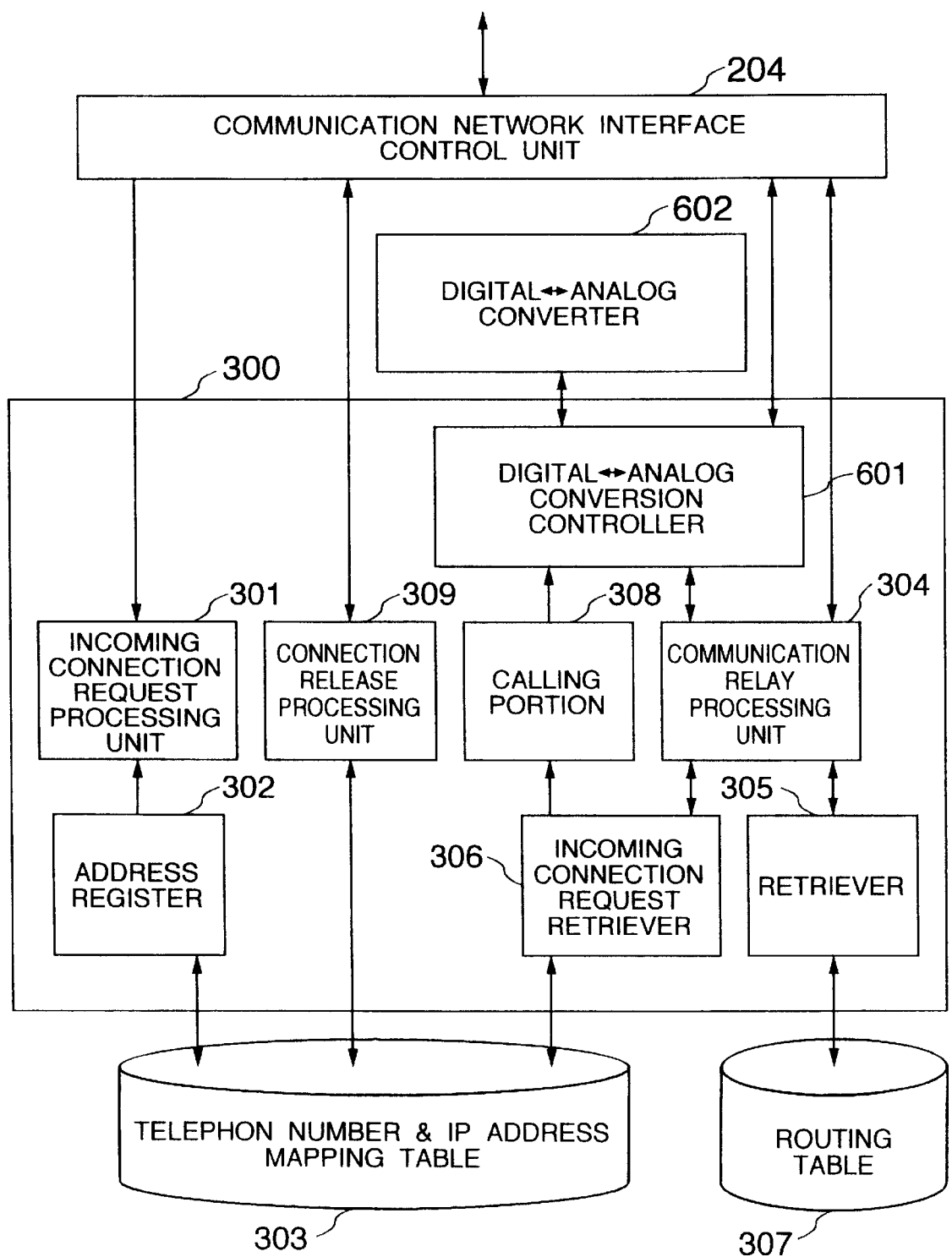
FIG. 8 is a block diagram of a communication control unit of a connection management server in the third embodiment of the invention.

FIG. 8 shows the construction of the communication control unit 300 of the connection management server 103.

As illustrated in FIG. 8, the connection management server 103 of this embodiment has a digital-to-analog/analog-to-digital conversion controller 601 additionally provided for controlling a digital-to-analog/analog-to-digital converter 602. The speech data and video data may be compressed/expanded by the digital-to-analog/analog-to-digital conversion controller 601. The communication network interface control unit 204 has a data communication port and speech-purpose port as the ports for connecting the public network 102.

Figure 9:
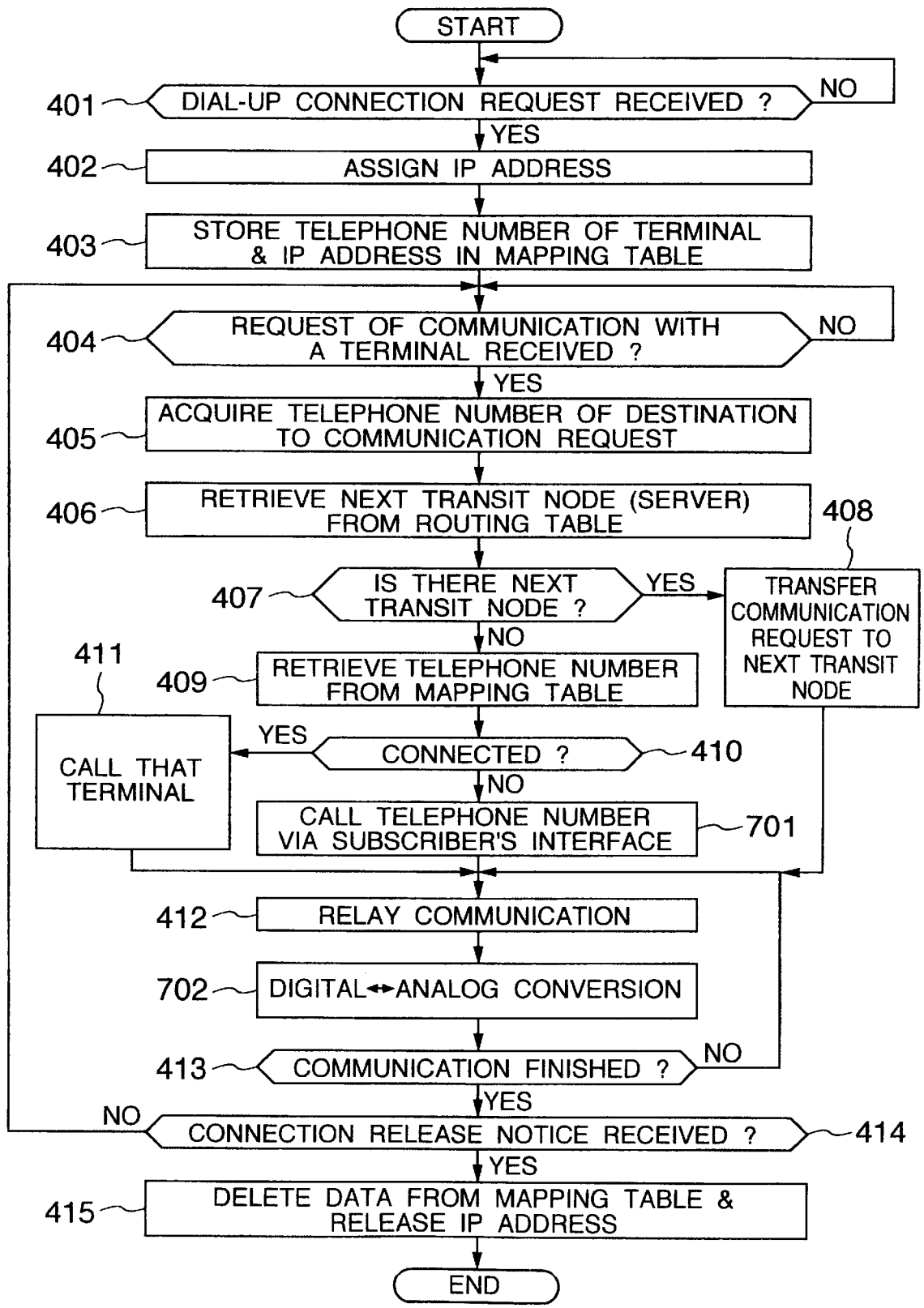
FIG. 9 is a flowchart of the process in the connection management server in the third embodiment of the invention.

FIG. 9 shows one example of the whole flow of the process in the connection management server 103 of this embodiment.

Referring to FIG. 9, when it is detected that the called-side communication terminal 104 is not connected to the internet at the above-mentioned step 410, the connection management server 103 regards a telephone as being connected to the telephone circuits of the called-side terminal, and calls by use of the unused speech port (step 701). The step 701 constitutes a calling means. If the called-side user answers the phone, the connection management server 103 sends the IP address of the own connection management server and communication request through the public network to the calling-side terminal 104, and relays the started speech (step 412). Thus, the step 412 produces an IP address notifying means. At this relaying, the connection management server 103 controls the digital-to-analog/analog-to-digital converter 602 to convert the speech data from the calling-side terminal 104 into an analog speech signal, which is then supplied to the above speech-purpose port. The analog signal from the called-side telephone is converted into speech data, and transmitted to the calling-side terminal (step 702). Thus, the step 702 constitutes a communication means.

The calling-side terminal starts the speech process when it receives the IP address and the speech request. In this speech process, the digital-to-analog/analog-to-digital converter 602 is controlled to convert the speech data from the called-side terminal into an analog speech signal, and supplies it to the output unit. In addition, the speech signal from the user through the input unit 204 is converted into speech data and supplied to the connection management server that previously supplied the IP address to the calling-side terminal.

The user who has subscribed only a single telephone channel installed by a telephone office often uses the single channel both for the connection to a communication terminal on the internet and for the speech by telephone, or the user usually has its telephone connected to the telephone channel except for the time during which the communication terminal is used. According to the communication system of this embodiment, when a telephone is connected to the telephone channel of the called-side terminal, speech can be transmitted or received between the communication terminals.

Figure 10:
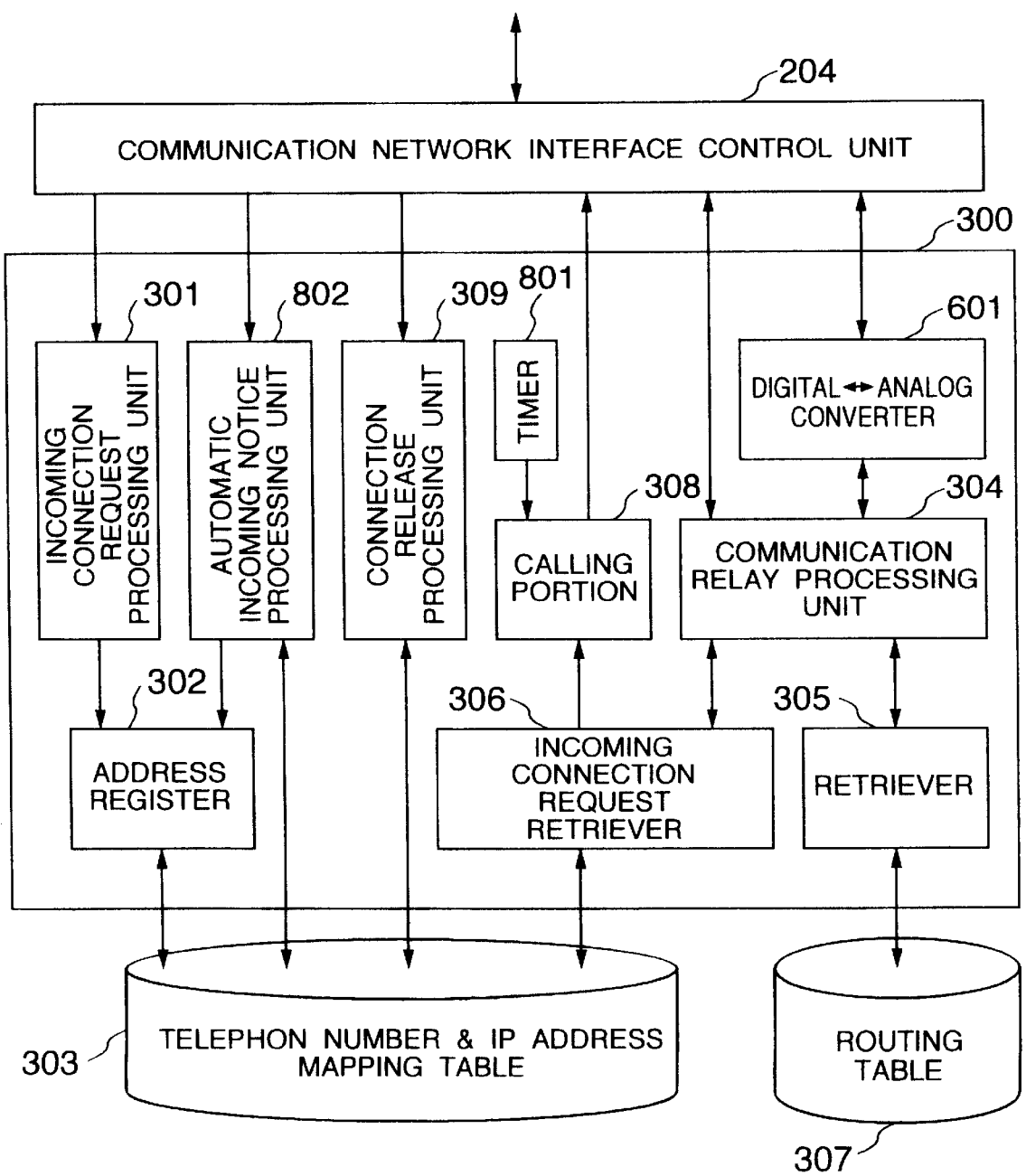
FIG. 10 is a block diagram of the communication control unit of the connection management server in a communication system according to a fourth embodiment of the invention.

A fourth embodiment of the invention will be described with reference to FIGS. 10 through 12.

In the communication system of this embodiment, when the called-side terminal 104 is not connected to the internet, the connection management server calls that terminal 104 through the public network, making it active for communication.

The whole construction of the system, the arrangement of each element, and the calling and called processes in the connection management server are the same as those in the third embodiment. However, the communication control unit 300 of the connection management server 103 of this embodiment has additionally provided therein a timer 801 for detecting the response time-out and an automatic incoming or terminating notice processor 802 for receiving the automatic incoming notice from the called-side terminal as illustrated in FIG. 10. The processor 802 serves as a means for receiving a permission notice as a response to the communication request from the called-side terminal and assigns the IP address to the called-side terminal.

Figure 11:
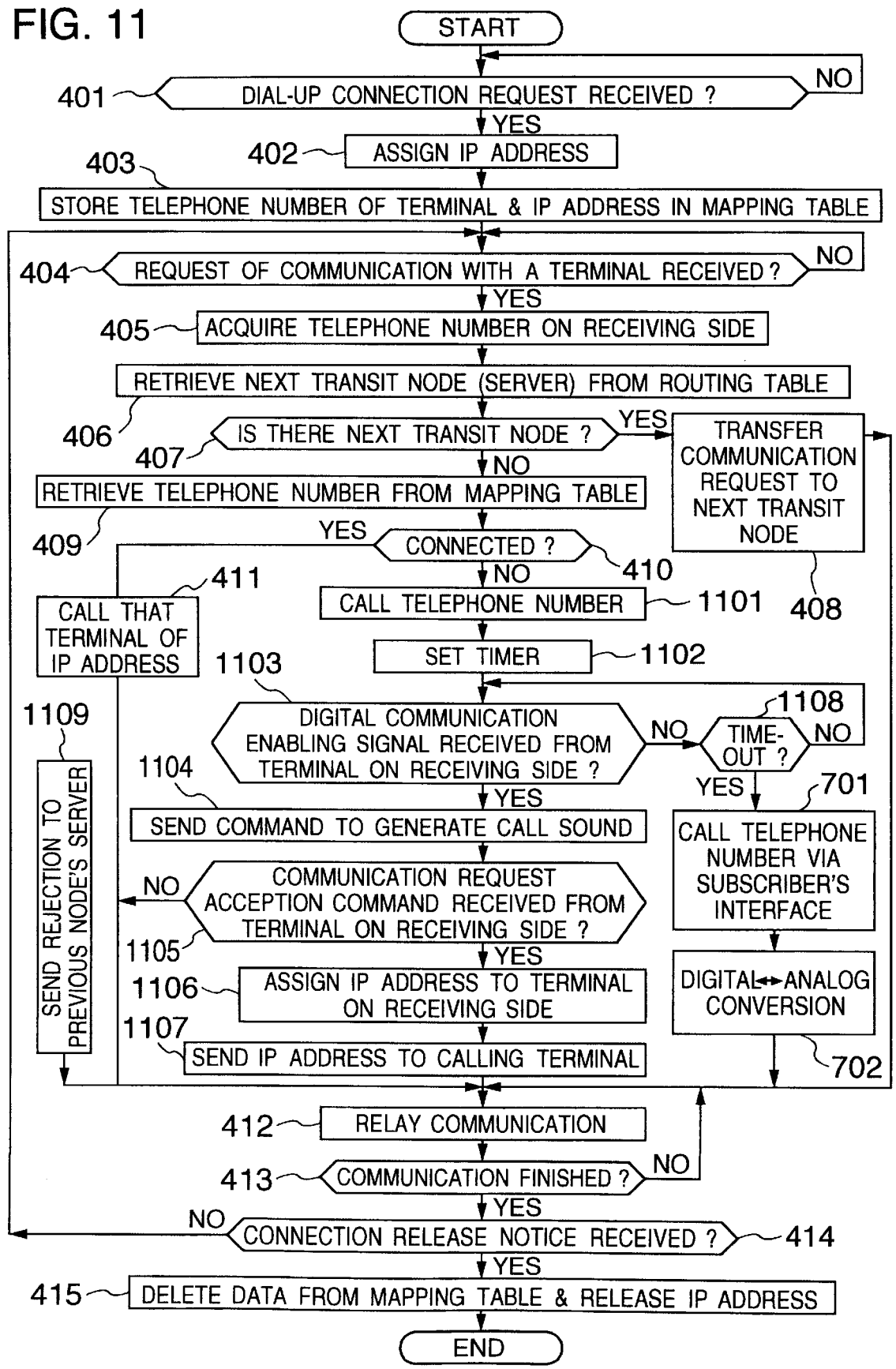
FIG. 11 is a flowchart of the process in the connection management server in the fourth embodiment of the invention.

FIG. 11 shows one example of the whole flow of the process in the connection management server nearest to the called-side terminal.

When it is detected that the called-side terminal 104 is not connected to the internet at step 410, the connection management server 103 originates a call to the terminal 104 by its telephone number, and after reception by the called-side terminal 104, it transmits a communication request to the called-side terminal (step 1101), and actuates the operation of the timer 801 (step 1102). When the connection management server 103 receives a command indicating that digital communication is possible from the called-side terminal 104 (step 1103), it sends to the called-side terminal 104 a command that orders to generate call sound (step 1104). Then, when the server receives a communication request accepting command from the called-side terminal 104 (step 1105, Yes), it assigns an IP address to the called-side terminal 104 (step 1106), sends the assigned IP address to the calling-side terminal (step 1107), and relays communication thus started between the terminals.

If, at step 1103, the command indicating that digital communication is possible is not received yet and the timer 801 detects the time-out (step 1108, Yes), it is decided that a telephone is connected to the corresponding telephone circuit, and the calling process mentioned in the third embodiment section is performed. At step 1105, if the communication with the called-side terminal is not permitted, the communication refusing signal is sent to the calling-side terminal through the server (step 1109).

Figure 12:
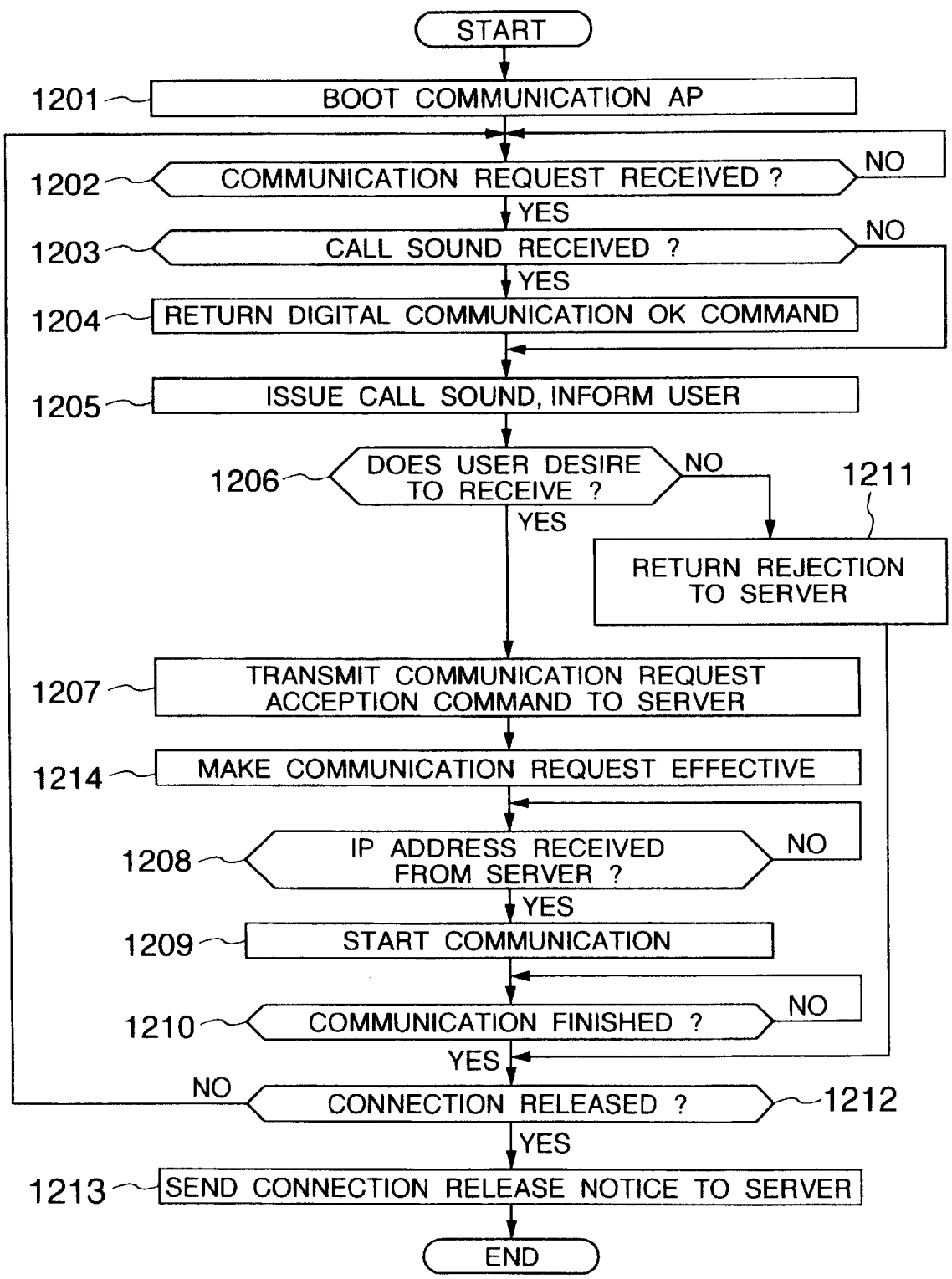
FIG. 12 is a flowchart of the process in the called-side terminal of a communication system according to the fourth embodiment of the invention.

FIG. 12 shows one example of the flow of the process necessary for the called-side terminal to wait for reception.

When the user boots a communication application program to start the operation of the client communication control unit 300 (step 1201), the communication terminal 104 is placed in the standby state for a call on the telephone channel. When a call comes, it automatically receives or terminates the call to receive the communication request (step 1202, Yes). When the terminal receives calling sound from a switching system on the public network (step 1203, Yes), it transmits to the above-mentioned connection management server a command that informs the terminal of being able to make digital data communication (step 1204).

The server 103 sends calling sound to the user to inform the user of the communication request, and the terminal receives the IP address of the calling-side terminal which is sent from the server (step 1205). When the user accepts the communication request (step 1206, Yes), the communication request accepting command is transmitted to the connection management server 103 (step 1207). This communication is made effective or valid by preparing the communication with the terminal 104 (step 1214). When the server transmits the IP address to the corresponding terminal (step 1208, Yes), the communication is started (step 1209). When the user orders to end the communication and connection (step 1210, Yes, step 1212, Yes), the terminal sends the connection end notice to the connection management server, and the communication channel is disconnected from the internet (step 1213). If the user rejects the communication at step 1206, the communication refusal notice is transmitted to the server (step 1211). When the user orders to disconnect, the connection end notice is supplied to the server at step 1213, thus the terminal being disconnected from the internet.

According to the communication system of this embodiment, even though the called-side terminal 104 is not connected to the internet, the calling-side user is able to call the called-side user, and start the communication. On the other hand, the called-side user is able to wait for a call under the condition that the terminal 104 is not connected to the internet, and hence to save the charge fees for call on the public network 102.

According to the third and fourth embodiments of the invention, since each communication terminal is able to generate, reproduce and transmit/receive speech data and video data, the communication systems can be used for the teleconferencing system which transmits/receive video and speech, and for the data conference system which transmits/receives image data and text data.

As will be understood from the above descriptions, the main points of the invention will be given below.

In the communication system of the invention, when the terminal is connected to the internet by means of dial-up connection, thereby making real time speech communication, it specifies the called party by the telephone number. The connection management server is provided at the access points within the internet. The functions of the server are to assign IP address, map the telephone numbers of the terminals connected by means of dial-up connection, and the assigned IP addresses, route from the telephone number to the nearest server, and execute calling process to the terminal which receives the communication request.

Figure 13A:
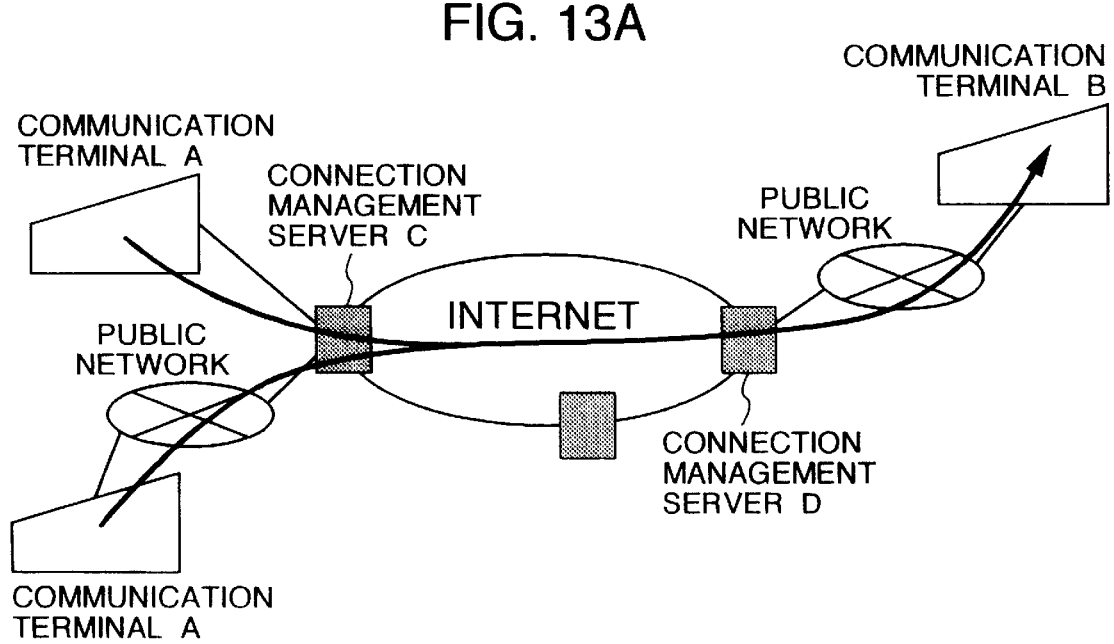
FIG. 13A is a block diagram of a communication system useful for explaining the essential points of the invention.

In the communication system with the construction shown in FIG. 13A, the communication sequence according to the invention will be briefly given as in FIG. 13B.

According to the invention, the user of a communication terminal is able to more easily start the communication with another communication terminal which is connected through the public network to the internet. In addition, even though the called terminal is not connected to the internet, communication and transmission/reception of speech can be started.

What is claimed is:

1. A communication system comprising:
    an internet;
    a plurality of communication terminals which are to be connected to said internet through a public network; and
    a plurality of connection management servers installed at nodes between said public network and said internet and transit points within said internet in order to relay and manage the communication between said communication terminals, each of said connection management servers including:

- means for receiving a request of connection to a internet from one of said communication terminals, and a telephone number of communication terminal, and for assigning an IP address to said communication terminal;
- a mapping table in which said IP address and said telephone number of said communication terminal are registered in pair;
- a routing table in which routing information is registered in association with each of a plurality of telephone numbers managed by a connection management server;
- means for receiving from one of said communication terminals a request of communication with another communication terminal, and a telephone number of said another communication terminal as a called-side terminal;
- means for determining a communication route to said called-side communication terminal on the basis of said routing information; and
- means for transferring said communication request and said telephone number through said communication route, wherein when said connection management server is a server to be connected through said public network to a called-side one of said communication terminals, said connection management server further including:

- means for deciding if said called-side communication terminal is connected to said internet by examining said mapping table to detect the presence or absence of said telephone number of said called-side communication terminal received together with said communication request from a calling-side communication terminal;
- when said called-side communication terminal is connected to said internet, said transferring means transfers said communication request to said called-side communication terminal; and
- means for receiving from said calling-side communication terminal a communication end notice for said internet and deleting said IP address that is assigned to said calling-side communication terminal and registered in said mapping table.

2. A communication system according to claim 1, wherein each of said connection management servers further includes means for informing said calling-side communication terminal of a fact that said called-side communication terminal is not connected to said internet when said called-side communication terminal is connected to an internet communication terminal.

3. A communication system according to claim 1, wherein:

said connection management server further includes means for calling said called-side communication terminal by way of a telephone channel of a telephone number of said communication terminal when said called-side communication terminal is not connected to said internet, means for sending the IP address of said connection management server to said calling-side communication terminal, conversion means for converting an analog speech signal into speech data, and converting speech data into an analog speech signal, and means for transmitting said analog speech signal through said calling telephone channel, and transmitting/receiving said speech data to/from said calling-side communication terminal; and said calling-side communication terminal includes means for converting an input analog speech into speech data, and reproducing a speech from said input speech data, and means for transmitting/receiving said speech data to/from said connection management server connected through said public network to said called-side communication terminal in accordance with said communication request.

4. A communication system according to claim 1, wherein:

said connection management server further includes means for calling said communication terminal by way of a telephone channel of a telephone number of said communication terminal, and transferring said communication request thereto when said called-side communication terminal is not connected to said internet, and means for receiving a permission notice relative to said communication request from said called-side communication terminal, and assigning said IP address to said called-side communication terminal; and said called-side communication terminal includes means for automatically receiving the call from said connection management server, means for transmitting said permission notice back thereto in accordance with a calling-side communication request, and means for making the communication with a calling-side communication terminal effective or valid when said permission notice is transmitted back thereto.

5. A communication system according to claim 1, wherein said communication terminals each includes means for receiving information indicative of speech and video, and converting said information into data of the format in which said data can be transmitted by way of said internet, and means for reproducing speech and video from received data.

6. A communicating system comprising:

an internet;

a plurality of communication terminals which are to be connected through a public network to said internet; and a plurality of connection management servers installed at the nodes between said public network and said internet, and at transit points within said internet in order to relay and manage the communication between said communication terminals, each of said connection management servers including:

- an incoming connection request terminating processing unit for receiving from one of said communication terminals a connection request to said internet and the telephone number of a communication terminal, and for assigning an IP address to said communication terminal;
- a mapping table in which said IP address and the telephone number of said communication terminal are registered in pair;
- a routing table having routing information registered in association with each of a plurality of telephone numbers which a connection management server manages;
- a communication relay processing unit for receiving from said communication terminal a communication request to another communication terminal and the telephone number of said another communication terminal as a called-side communication terminal; and a transfer portion for transferring said communication request and said telephone number to said called-side communication terminal through a communication route based on said routing information, wherein when said connection management server is a server to be connected through said public network to a called-side one of said terminals, said server further including:

an incoming connection request terminating retriever for deciding if said called-side communication terminal is connected to said internet by examining whether the telephone number of said called-side communication terminal is registered in said mapping table or not;

when said called-side communication terminal is connected to said internet, said transfer portion transfers said communication request to said called-side communication terminal; and a connection end processing unit for receiving a communication end notice for said internet and deleting said IP address assigned to said calling-side communication terminal and registered in said mapping table.

7. A communication system according to claim 6, wherein said connection management server further includes a disconnected-state notifying portion for informing a calling-side communication terminal of a fact that said called-side communication terminal is not connected to the internet when said called-side communication terminal is not connected to said internet.

8. A communication system according to claim 6, wherein:

said connection management server further includes a calling portion for calling said called-side communication terminal by way of a telephone channel of a telephone number of said communication terminal when said called-side communication terminal is not connected to said internet, a relay portion for sending the IP address of said connection management server to said calling-side communication terminal, a converter for converting an analog speech signal into speech data, and converting speech data into an analog speech signal, and a communication processing unit for transmitting said analog speech signal through said called telephone channel, and transmitting/receiving said speech data to/from said calling-side terminal; and said calling-side communication terminal includes a converter for converting an input analog speech into speech data, and reproducing speech from speech data, and a transmitter/receiver for transmitting/receiving said speech data to/from said connection management server connected through said public network to said called-side communication terminal in response to a speech request.

9. A communication system according to claim 6, wherein a calling portion of said connection management server calls said called-side communication terminal by way of the telephone channel of its telephone number when said called-side communication terminal is not connected to said internet, said communication request being transferred, said incoming connection request terminating processing unit thereof receives a permission notice relative to said communication request from said called-side communication terminal and assigns said IP address to said called-side communication terminal, said called-side terminal includes a receiving portion for automatically receiving said call from said connection management server, a sending-back portion for transmitting said permission notice back in accordance with said communication request, and a communication enabling process controller for making the communication with a calling-side communication terminal effective or valid when said permission notice is returned.

10. A communication system according to claim 6, wherein said communication terminals each has a converter for receiving information indicative of speech and video, converting said information into data of the format in which said data can be transmitted through said internet, and transmitting said data, and an output unit for reproducing speech and video from received data.

11. A communication method in a communication system including an internet, a plurality of communication terminals which are to be connected to said internet through a public network, and a plurality of connection management servers provided at nodes between said public network and said internet and at transit points within said internet in order to relay and manage the communication with said communication terminals, comprising the steps of:

receiving a connection request from a calling-side terminal of said terminals to said internet, and a telephone number of said calling-side communication terminal, and assigning an IP address to said calling-side communication terminal, by each of said connection management servers;

registering said IP address and the telephone number of said calling-side communication terminal in pair in a mapping table;

receiving a communication request to a called-side communication terminal from said calling-side communication terminal and a telephone number of said called-side communication terminal by a connection management server;

determining a communication route to said called-side communication terminal by said connection management server on the basis of routing information registered in a routing table in association with said received telephone number together with said communication request so that said communication request and said telephone number are transferred through said communication route;

when said connection management server is connected to said called-side communication terminal through said public network, examining whether the telephone number of said called-side communication terminal received together with said communication request is registered or not in said mapping table, thereby deciding if said called-side terminal is connected to said internet;

when said called-side communication terminal is connected to said internet, transfer said communication request to said called-side communication terminal;

receiving the notice that the connection to said internet has become unnecessary because of the end of the communication from said calling-side communication terminal, and deleting said IP address assigned and registered in said mapping table by said connection management server.

12. A communication method according to claim 11, wherein when said called-side communication terminal is not connected to said internet, said connection management server informs said calling-side communication terminal of a fact that said called-side communication terminal is not connected to said internet.

13. A communication method according to claim 11, wherein when said called-side communication terminal is not connected to said internet, said connection management server:

calls said called-side communication terminal by way of the telephone channel of its telephone number;

sends the IP address of said connection management server to said calling-side communication terminal;

convert an analog speech signal into speech data, and converting speech data into an analog speech signal; and transmits/receives said analog speech signal through a calling telephone channel, and transmits/receives said speech data to/from said calling-side communication terminal, and said calling-side communication terminal:

converts an input analog speech signal into speech data, and reproduces speech from said speech data; and responds to said communication request to transmit/receive said speech data to/from said connection management server connected to said called-side communication terminal through said public network.

14. A communication method according to claim 11, wherein said connection management server:

when said called-side communication terminal is not connected to said internet, calls said called-side communication terminal by way of the channel of its telephone number, and transfers said communication request thereto; and receives a permission notice relative to said communication request from said called-side communication terminal, and assigns an IP address to said called-side communication terminal, and said called-side communication terminal:

automatically receives a call from said connection management server;

responds to said communication request to send said permission notice back thereto; and makes the communication with said calling-side communication terminal effective or valid when said permission notice is transmitted back.

\* \* \* \* \*